United States Patent
Burton

(10) Patent No.: US 12,060,723 B2
(45) Date of Patent: Aug. 13, 2024

(54) MANAGING RESTORATION EQUIPMENT OPERATIONS AND DEPLOYMENT

(71) Applicant: Next Gear Solutions, LLC, Oxford, MS (US)

(72) Inventor: Brandon Burton, Mount Vernon, WA (US)

(73) Assignee: NEXT GEAR SOLUTIONS, LLC, Oxford, MS (US)

( * ) Notice: Subject to any disclaimer, the term of this patent is extended or adjusted under 35 U.S.C. 154(b) by 162 days.

(21) Appl. No.: 17/396,497

(22) Filed: Aug. 6, 2021

(65) Prior Publication Data

US 2023/0043124 A1 Feb. 9, 2023

(51) Int. Cl.
*E04G 23/02* (2006.01)
*H04L 67/12* (2022.01)
*H04W 4/80* (2018.01)

(52) U.S. Cl.
CPC .......... *E04G 23/0218* (2013.01); *H04L 67/12* (2013.01); *H04W 4/80* (2018.02)

(58) Field of Classification Search
CPC .................................. H04W 4/33; H04W 4/38
See application file for complete search history.

(56) References Cited

U.S. PATENT DOCUMENTS

| | | | |
|---|---|---|---|
| 8,172,154 B1 * | 5/2012 | Figley | F24F 11/63 165/223 |
| 2007/0276626 A1 | 11/2007 | Bruffey | |
| 2008/0041970 A1 * | 2/2008 | Hagentoft | F24F 11/30 236/44 A |
| 2015/0371347 A1 * | 12/2015 | Hayward | G16H 10/20 705/314 |
| 2017/0314804 A1 * | 11/2017 | Kannan | F24F 11/52 |
| 2018/0140989 A1 * | 5/2018 | Arthur | B01D 46/521 |
| 2019/0365180 A1 * | 12/2019 | Miyamoto | A47L 9/2847 |
| 2020/0149770 A1 * | 5/2020 | Sinha | F24F 11/80 |
| 2020/0200147 A1 * | 6/2020 | Dietzel | B63H 20/007 |
| 2020/0267015 A1 * | 8/2020 | Peterson | H04L 12/2816 |

* cited by examiner

*Primary Examiner* — Wen W Huang
(74) *Attorney, Agent, or Firm* — Sheridan Ross P.C.

(57) ABSTRACT

A method for managing restoration assets, a restoration sensor, a system, and a controller for use in a mitigation environment are provided. An illustrative method may include receiving first sensor data describing an environmental condition in proximity to a first restoration asset, receiving second sensor data describing an environmental condition in proximity to a second restoration asset, comparing the first sensor data with the second sensor data, and determining a drying condition for a building in which the first restoration asset and the second restoration asset are provided based on the comparison of the first sensor data with the second sensor data.

20 Claims, 10 Drawing Sheets

MANAGING RESTORATION EQUIPMENT OPERATIONS AND DEPLOYMENT

FIELD OF THE DISCLOSURE

Embodiments of the present disclosure relate to managing operations of water damage restoration equipment and to systems that improve the efficacy with which restoration equipment is used and deployed.

BACKGROUND

Water damage is a common type of damage to buildings and structures. Owners of the buildings and structures subject to water damage are often faced with the decision of whether to repair building assemblies and components (e.g., drywall, flooring, trim, framing) affected by water damage or replace them. The decision to repair or replace considers the value of the material affected, the degree of damage, the cost to repair, insurance carrier policies, intrinsic value and the availability of like kind and quality replacement materials. A decision to repair is usually influence by the property owner's insurance policy and insurance carrier determinations. Repair efforts involve a comprehensive remediation or restoration process in which remediation assets, such as fans, heaters, and dehumidifiers, are positioned throughout the structure to help dry out the structure. It is important to sufficiently dry a structure before taking any further or final remediation measures. Failure to sufficiently dry out a structure may result in mold growth opportunities or long-term structural damage.

SUMMARY

Embodiments of the present disclosure contemplate an improved restoration system and method. In particular, embodiments of the present disclosure contemplate systems and methods for monitoring and managing restoration equipment (e.g., restoration assets) and their deployment during restoration operations.

As can be appreciated, when a structure or building is damaged by water, it is very important to sufficiently dry out the structure or building. If moisture is left behind, then the chances of mold developing in the structure increases significantly. Thus, most restoration projects have a number of requirements regarding drying conditions.

As used herein, the term restoration assets may be used to refer to any type of equipment, machine, person, sensor, or combination thereof used to assist in a restoration or remediation process. It should also be appreciated that the terms restoration and remediation may be used interchangeably to refer to the process of fixing a damaged (e.g., water damaged) structure or building.

A restoration or remediation may include identifying locations of water or moisture in a structure or building, deploying restoration assets in proximity to the identified locations of water or moisture, allowing the restoration assets to operate for an amount of time sufficient to remove or sufficiently minimize the amount of water or moisture at the identified locations, and possibly replacing any material(s) that cannot be sufficiently dried out after having a restoration asset deployed in proximity thereto.

In some embodiments, a drying condition may be used to identify or determine a restoration or suggested remedial measure. Non-limiting examples of suggested remedial measures include: (1) changing the position of restoration asset(s); (2) reducing the quantity of restoration asset(s); (3) increasing the quantity of the restoration asset(s); and/or (4) changing the type of restoration assets being used (e.g., replacing refrigerant dehumidifiers with desiccant dehumidifiers).

Embodiments of the present disclosure contemplate systems, methods, and sensors for use in facilitating a restoration or remediation process. In some embodiments, a method for managing restoration assets is provided that includes:

receiving first sensor data from a first sensor, where the first sensor data provides information describing an environmental condition in proximity to a first restoration asset;

receiving second sensor data from a second sensor;

comparing the first sensor data with the second sensor data;

determining, based on comparing the first sensor data with the second sensor data, a vapor pressure differential; and based on the vapor pressure differential, determining a drying condition for a building in which the first restoration asset is provided.

The second sensor data may provide information describing an environmental condition in proximity to a second restoration asset. In some embodiments, the first sensor may be associated with the first restoration asset and the second sensor may be associated with the second restoration asset. Association may be achieved by placing the sensor within a predetermined proximity of the restoration asset, by physically attaching the sensor to the restoration asset, and/or by assigning an associative relationship between the sensor and restoration asset within a database.

In some embodiments, the method may further include: providing a report of the drying condition to a communication device, where the report includes a description of a relative location of the first restoration asset with respect to the second restoration asset. The report may include a number of items. For instance, the report may include a proposed new location, change in quantity, and/or change in type for at least one of the first restoration asset and the second restoration asset. The report may alternatively or additionally include a layout of the building, a depiction of the first restoration asset in the layout of the building, a depiction of the second restoration asset in the layout of the building, and/or a determination of whether the drying condition corresponds to a favorable drying condition or an unfavorable drying condition. The determination of a drying condition (whether favorable or unfavorable) may help in determining or identifying a remedial measure to take as part of further drying a building.

In some embodiments, the method may further include:

receiving third sensor data from a third sensor, where the third sensor data provides information describing an environmental condition outside of the building;

comparing the third sensor data with at least one of the first sensor data and the second sensor data; and providing a notification to a communication device that indicates the environmental condition outside of the building is impacting the drying condition for the building.

The method may also include providing, as part of the notification, a suggested remedial measure to minimize the impact of the current or future environmental condition outside of the building on the drying condition for the building. As an example, a guideline engine could be used such that some of the rules applied as part of determining the drying condition can be reconfigured/customized on a per-client or per-project basis.

In some embodiments, the first sensor data and/or second sensor data may be received via a wireless signal (e.g., via WiFi, Bluetooth, Zigbee, etc.). The first sensor data and/or second sensor data may include temperature data, humidity data, moisture data, vapor pressure data, and/or air flow data.

In some embodiments, the method may further include:
- determining a change in the first sensor data over a period of time;
- determining a change in the second sensor data over the period of time;
- based on the change in the first sensor data over the period of time and the change in the second sensor data over the period of time, determining an updated drying condition for the building; and providing a report of the updated drying condition to a communication device.

The updated drying condition may be used to determine an updated remedial measure. Alternatively or additionally, if one or more sensors do not indicate an improvement in the drying condition over time, the method may include generating a message suggesting changes to the restoration or remediation assets (e.g., type, location, orientation, etc.)

In some embodiments, the method(s) described herein may utilize a restoration sensor and/or other generic sensors. As an example, the first sensor or second sensor of the method described above may utilize a generic sensor or a restoration sensor. A restoration sensor may include:
- a transducer that generates sensor data, wherein the sensor data comprises temperature and humidity information for an airflow;
- memory that stores the sensor data;
- a communication interface that enables a communication of the sensor data from the memory to a controller; and
- a processor that controls a frequency with which the sensor data is communicated from the memory to the controller.

In some embodiments, the transducer may include an aspirated psychrometer and the airflow may pass through the aspirated psychrometer. The aspirated psychrometer may provide electrical energy to the processor, for example by harvesting power from the airflow being used to dry a building. The restoration sensor may further include an indicator light that is activated when the aspirated psychrometer is actively providing electrical energy to the processor. In some embodiments, the processor may increase the frequency with which the sensor data is communicated from the memory to the controller in response to being provided electrical energy from the aspirated psychrometer and decreases the frequency with which the sensor data is communicated from the memory to the controller in response to not being provided electrical energy from the aspirated psychrometer. In some embodiments, the communication interface communicates the sensor data from memory to the controller even when the processor is not being provided electrical energy from the aspirated psychrometer.

The restoration sensor may also be configured to operate with additional sensors. In some embodiments, the restoration sensor may further include an additional sensor input that receives second sensor data from an external sensor, where the second sensor data describes an environmental condition in proximity to the restoration sensor.

In some embodiments, the communication interface of the restoration sensor may include a wireless communication interface and the sensor data may be communicated via a wireless communication protocol.

A system is also described herein that includes:
- a first sensor that generates first sensor data describing an environmental condition in proximity to a first restoration asset;
- a second sensor that generates second sensor data describing an environmental condition in proximity to a second restoration asset; and
- a controller that receives the first sensor data and the second sensor data, compares the first sensor data with the second sensor data, and determines a drying condition for a building in which the first restoration asset and the second restoration asset are provided based on the comparison of the first sensor data with the second sensor data.

In some embodiments, the controller is provided as part of one of the first sensor and the second sensor, the first sensor may include an aspirated psychrometer, the first sensor data may include temperature and humidity information for an airflow, and the controller may determine a vapor pressure differential based on comparing the first sensor data with the second sensor data.

In some embodiments, the controller may receive at least one of the first sensor data and the second sensor data via packets formatted according to a wireless communication protocol. Third sensor data may also be received at the controller and the third sensor data may describe an environmental condition outside of the building. The controller may be configured to determine an updated drying condition and/or remedial measure for the building based on the third sensor data.

In some embodiments, a controller for use in a water mitigation environment is provided that includes:
- a processor; and
- computer memory coupled to the processor, where the computer memory stores instructions that, when executed by the processor, enable the processor to:
  - receive first sensor data describing an environmental condition in proximity to a first restoration asset;
  - receive second sensor data describing an environmental condition in proximity to a second restoration asset;
  - compare the first sensor data with the second sensor data; and
  - determine a drying condition for a building in which the first restoration asset and the second restoration asset are provided based on the comparison of the first sensor data with the second sensor data.

The term "computer-readable medium," as used herein, may refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credential information" may be any data, set of data, encryption scheme, key, and/or transmission protocol used by a particular device (e.g., a "credential device") to authenticate and/or verify its authenticity with a reader, and/or interrogator.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, may be used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
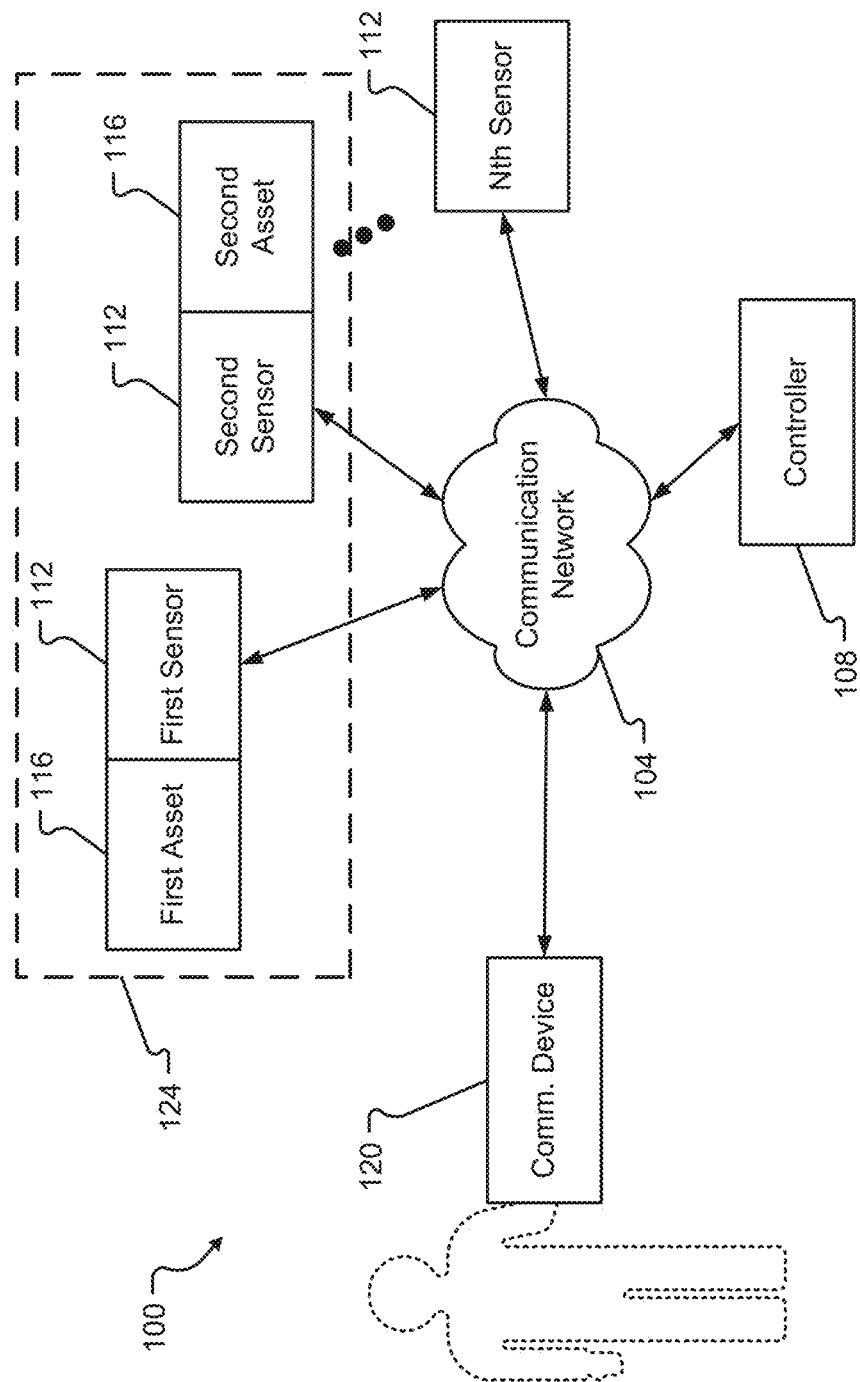
FIG. 1A illustrates a first configuration of a restoration system according to at least one example embodiment.

With reference to FIG. 1A, an illustrative restoration system 100 will be described in accordance with at least some embodiments of the present disclosure. The system 100 is shown to include at least one sensor 112 and at least one asset 116 distributed throughout a building 124 or structure. One or more other sensors 112 may be provided external to the building 124 or structure. In some embodiments, the sensor(s) 112 provided within the building 124 or structure may be configured to provide information describing environmental conditions within the building 124 or structure whereas sensor(s) 112 provided outside the building 124 or structure may be configured to provide information describing an environmental condition outside of the building 124 or structure.

As shown in FIG. 1A, one or more sensors 112 may be associated with one or more assets 116. Association of a sensor 112 with an asset 116 may be achieved in a number of ways. As some non-limiting examples, a sensor 112 may be associated with an asset 116 by providing the sensor 112 within a predetermined proximity or distance of the asset 116, by attaching the sensor 112 to the asset 116, by linking a database entry for the sensor 112 with a database entry for the asset 116, or combinations thereof. In some embodiments, associating a sensor 112 with an asset 116 may enable an assumption that sensor data generated by the sensor 112 represents an environmental condition within proximity of the associated asset 116.

A restoration asset 116 may correspond to one or multiple devices, systems, machines, or the like that are configured to assist with a restoration process. Non-limiting examples of restoration assets 116 include fans, dehumidifiers, heaters, air movers, lights, vacuums, drying chemicals, sponges, blankets, etc.

Figure 1B:
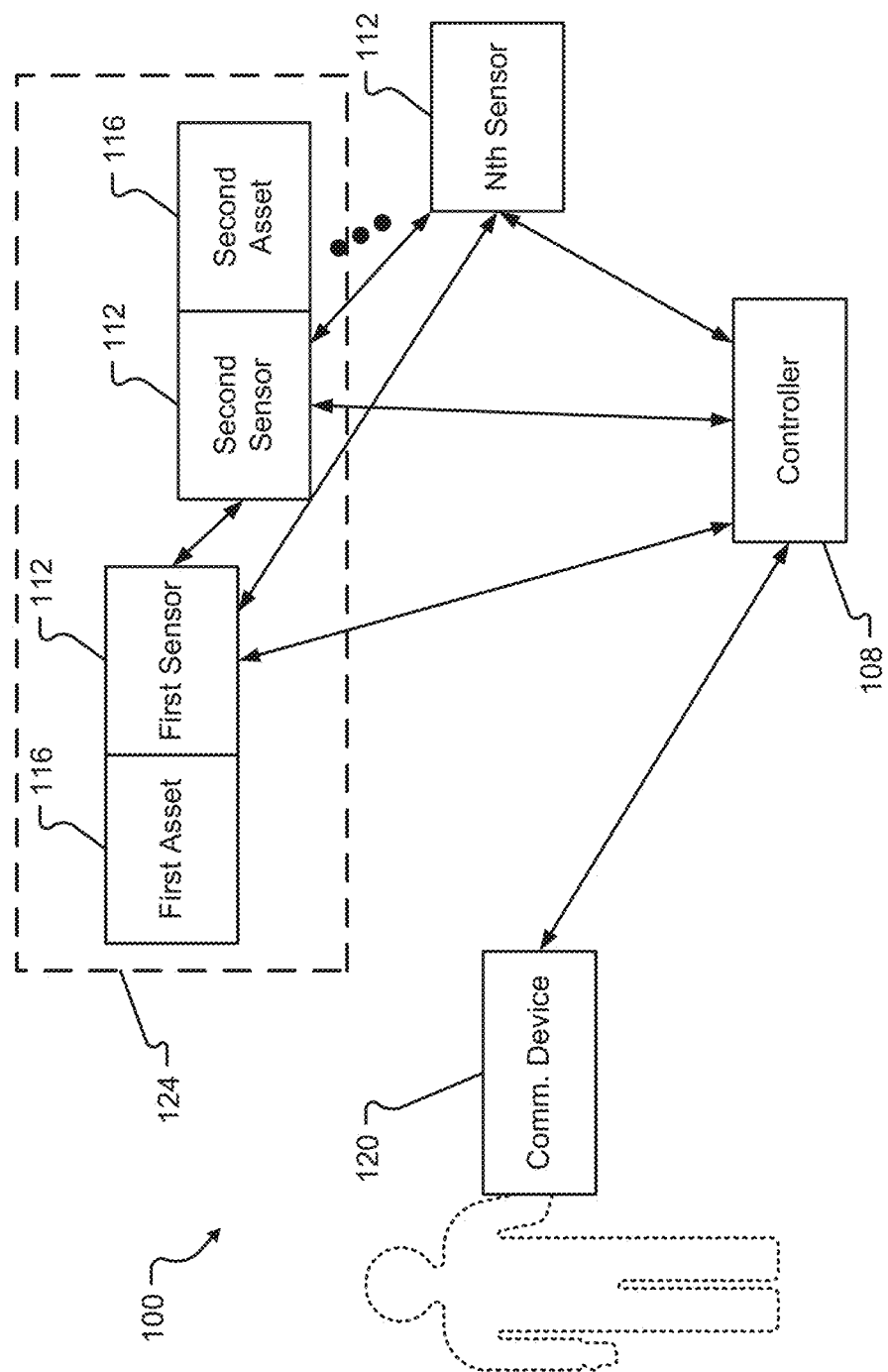
FIG. 1B illustrates a second configuration of a restoration system according to at least one example embodiment.

As will be discussed in further detail herein, a sensor 112 may correspond to any type of device or collection of devices used to express an environmental condition as an electrical signal. As such, a sensor 112 may include one or more transducers, gauges, circuits, or the like that are capable of converting a physical condition (e.g., temperature, humidity, air speed, moisture content, light intensity, visible and non-visible light spectrum images, etc.) into a measurable voltage, current, capacitance, inductance, resistance, etc. The electrical signal(s) generated by a sensor 112 may be used to create sensor data, which may be stored within the sensor 112 and/or communicated to a controller 108 for analysis. The sensor(s) 112 may be configured to communicate with one another and/or the controller 108. In the configuration of FIG. 1A, a communication network 104 is used to facilitate communications between sensor(s) 112 and/or between sensor(s) 112 and the controller 108 whereas the configuration of FIG. 1B illustrates a mesh network configuration where nodes of the network (e.g., sensor nodes, controller nodes, etc.) are allowed to communicate directly with one another.

Each sensor 112 may be configured to store its sensor data in local memory and/or communicate the sensor data to another node of the system 100. In some embodiments, the sensor data may be communicated over the communication network 104 using data packets, a data stream, or the like. Alternatively or additionally, sensor data may be communicated directly from one sensor 112 to another sensor 112. Alternatively or additionally, sensor data may be communicated directly from one sensor 112 to the controller 108 for analysis.

The sensor data may provide information describing an environmental condition in proximity to the sensor 112. Sensor data may also describe an environmental condition in proximity to a restoration asset 116. The frequency with which sensor data is communicated from a sensor 112 to another node in the system 100 may depend on a number of factors. For instance, the frequency may depend upon the rate with which readings at the sensor 112 are changing, whether the sensor 112 has power, whether the sensor 112 is receiving power from an external power source, whether the sensor 112 is receiving power from an internal power source, whether the sensor 112 has communication connectivity (e.g., connection to the communication network 104 or with another sensor 112), or the like. Sensor data may be transmitted by a sensor 112 each time the sensor 112 acquires new readings from a surrounding environment or sensor data may be collected for a predetermined amount of time, then transmitted in a batch (e.g., sensor data may include a number of sensor readings).

Communications in the system 100 may be facilitated by wired or wireless connections. In some embodiments, the communication network 104 may leverage wireless communication connections or protocols to facilitate device-to-device communications. In some embodiments, a wireless mesh network may be established between nodes of the system. Wireless communication connections or protocols that may be used within the system 100 can include communications at least one of conventional radio protocols, proximity-based wireless communication protocols, Bluetooth™, BLE, infrared, audible, NFC, RF, Zigbee, WiFi, and other wireless communication networks and/or protocols.

The communication network 104 can facilitate communication via at least one of conventional radio networks, wireless communication networks, Zig-Bee, GSM, CDMA, WiFi, and/or using other communication networks and/or protocols as provided herein. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, RS-485, similar networks used in access control systems between readers and control panels, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The controller 108 may be configured to receive sensor data from the various sensors 112 in the system 100 and analyze the sensor data as will be described in further detail herein. The controller 108 may also be configured to generate one or more reports that describe a drying condition of the building 124 or structure and provide the report(s) to a communication device 120. Communications between the controller 108 and communication device 120 may be facilitated by the communication network 104 or may by direct communications that bypass a larger communication network.

The communication device 120 may include any type of known computational device that facilitates communications for a user thereof. Non-limiting examples of communication devices 120 include a mobile phone, a cellular phone, a smartphone, a Personal Computer (PC), a laptop, a Personal Digital Assistant (PDA), or the like. Any type of device that is capable of communicating with controller 108 and presenting information to a user may be considered a viable communication device 120.

Figure 2:
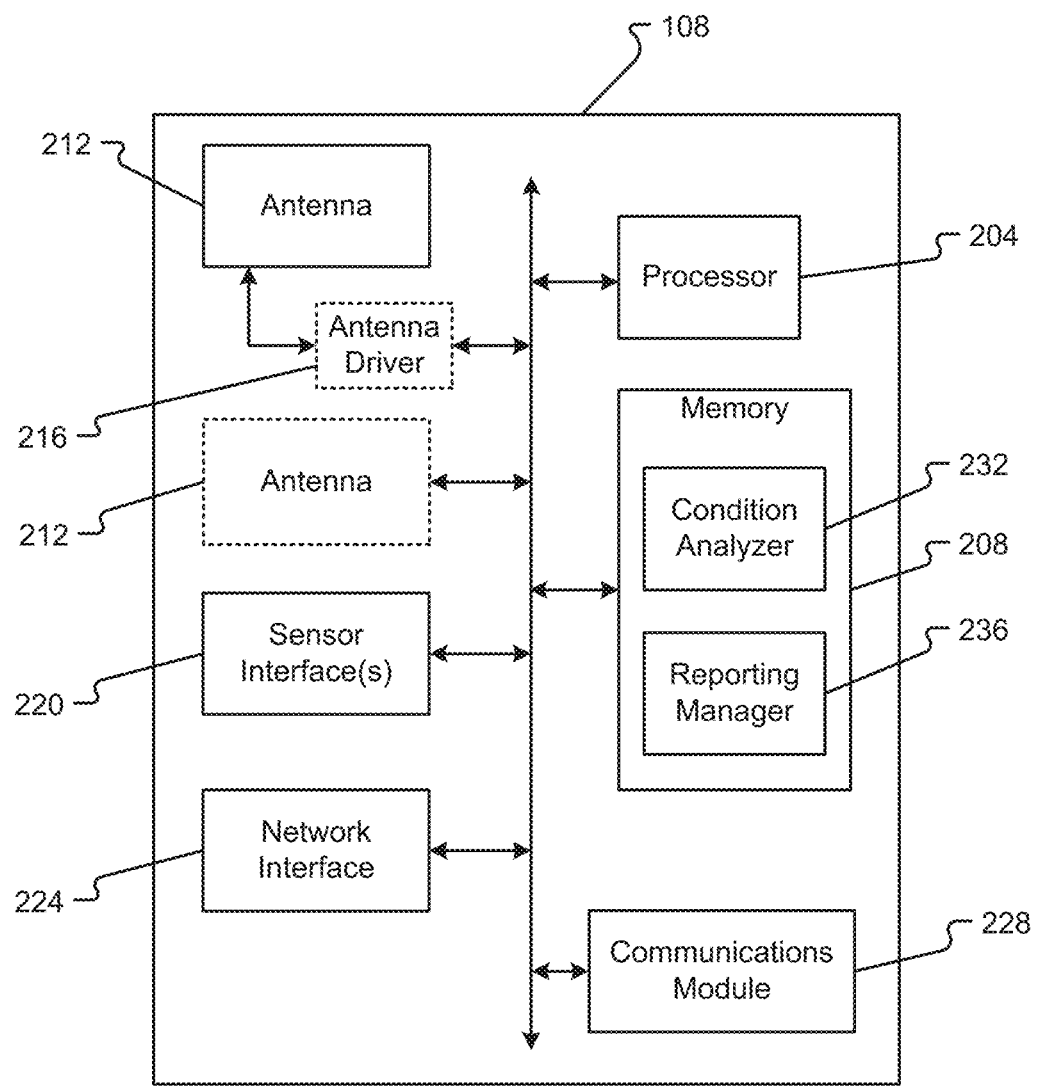
FIG. 2 illustrates a controller for use in a restoration system according to at least one example embodiment.

Referring now to FIG. 2, a block diagram depicting a controller 108 is shown in accordance with embodiments of the present disclosure. The controller 108 may include one or more components, such as, a processor 204, memory 208, an antenna 212 (or multiple antennas 212), a communications module 228, a sensor interface 220, and a network interface 224. In some embodiments, the controller 108 may further include a power module or internal power source.

The memory 208 of the controller 108 may be used in connection with the execution of application programming or instructions by the processor 204, and for the temporary or long term storage of program instructions and/or data. The memory 208 may contain executable instructions or functions that are used by the processor 204 to run other components of the controller 108. In one embodiment, the memory 208 may be configured to store instructions in the form of a condition analyzer 232 and a reporting manager 236, among other instructions. In some embodiments, the memory 208 may comprise volatile or non-volatile memory and a controller for the same. Non-limiting examples of memory 208 that may be utilized in the controller 108 include RAM, ROM, buffer memory, flash memory, solid-state memory, or variants thereof.

The condition analyzer 232, when executed by the processor 204, may be configured to receive sensor data from a number of different sensors 112 and then analyze the sensor data. The condition analyzer may also be configured to receive historical sensor data and historical drying condition results which are then compared to the present sensor data and data trends to produce predictive drying results or remedial actions. As a non-limiting example, the condition analyzer 232 may be configured to analyze sensor data received at the sensor interface(s) 220, which may include first sensor data from a first sensor 112, second sensor data from a second sensor 112, up to Nth sensor data from an Nth sensor 112. The condition analyzer may be configured to compare the received sensor data with other sensor data, including other sensor data received within approximately the same time frame. The condition analyzer 232 may also compare sensor data with historical sensor data for the same sensor 112 or historical sensor data from different sensors 112.

As a non-limiting example, the condition analyzer 232 may be configured to compare the sensor data received from different sensors 112 to determine a drying condition or multiple different drying conditions for a building 124 or structure. The information describing one or more drying conditions can be used to determine or identify particular remedial measure(s) that can be taken to improve or enhance the drying condition. Non-limiting examples of drying condition(s) that may be determined by the condition analyzer 232 include: whether a fan/airmover is currently operational, whether a dehumidifier is currently operational, whether air movement is favorable to drying, whether air movement is unfavorable to drying, whether dehumidification is favorable to drying (e.g., if the humidity ratio or gpp is being reduced by the dehumidifier), whether dehumidification is unfavorable to drying (e.g., if the humidity ratio is not being reduced), whether temperature changes are favorable to drying, whether temperature changes are unfavorable to drying, whether moisture content of building materials (e.g., wood framing, sheeting and decking, concrete, drywall, wood flooring, etc.) indicates drying, the degree of saturation indicated by moisture content as an element of determining the vapor pressure associated with said moisture content, a vapor pressure differential between the air being used to dry and the water in building materials, whether a vapor pressure differential is favorable to drying, whether a vapor pressure differential is unfavorable to drying, whether humidity over time is favorable to drying, whether humidity over time is unfavorable to drying, predictive drying rate, predictive drying time, airflow at a dehumidifier outlet, whether outdoor (e.g., conditions outside the building 124) are favorable/unfavorable to drying, or combinations thereof. In some embodiments, the combination of some or all of the above-noted drying conditions may be represented as an aggregated drying score. The aggregated drying score may provide a weighted representation of multiple different drying conditions or scores as discussed above, but within a single numeric value. The aggregated drying score can then be analyzed (e.g., compared to an aggregated drying score threshold) to determine if a building 124 or particular location within a building 124 is drying satisfactorily or is forecast to dry within a predetermined time frame.

A vapor pressure differential may be measured/obtaining using readings from one or more sensors 112. Illustratively, there may be two types of vapor pressure differential the system will calculate and evaluate. One is the difference in vapor pressure between two sensors (e.g., a vapor pressure difference measured between location 1 and location 2)—this allows a determination of whether or not air is being properly circulated. Temperature and/or humidity can also be used to obtain this information and comparisons between sensor 112 readings can be used for such purposes. Another type of vapor pressure differential can be calculated from a single sensor 112. In this situation, the temperature and humidity of the air is measured to get value 1, then the temperature and the moisture content of the material is measured to estimate the vapor pressure internally within the material for value 2. A difference can then be calculated between value 1 and value 2 to determine if the difference is sufficient to promote rapid drying (e.g., >1").

A fan or airmover may be analyzed for proper operation and a comparison of sensor data from multiple different locations in a building 124 may help determine whether or not the various fans/airmovers (examples of restoration assets 116) are properly positioned throughout the building 124. If temperature, humidity and/or vapor pressure readings at multiple different sensors 112 positioned throughout the building 124 are substantially similar (e.g., within a predetermined value or one another or within a predetermined deviation from one another, such as +/−2 degrees Fahrenheit, +/−5% humidity, +/−0.05 atm, etc.), then it may be determined that the system 100 is balanced and the restoration assets 116 having sensors 112 associated therewith are appropriately distributed throughout the building 124. If the temperature obtained at one or more sensors 112 differs from the temperature obtained from one or more other sensors by more than the predetermined value/predetermined deviation, then the building 124 may be determined to be unbalanced and recommendations may be developed by the condition analyzer 232 in cooperation with the reporting manager 236 to suggest possible different locations for one or more fans/airmovers. In this way, the condition analyzer 232 may work in concert with the reporting manager 236 to provide a report that indicates a proposed different location for at least one restoration asset 116. A similar approach may be used by analyzing humidity information from sensor data rather than simply analyzing temperature information from sensor data. If humidity information from one or more sensors 112 differs from the humidity information obtained from one or more other sensors 112, then the building 124 may be determined to be unbalanced and recommendations may be developed by the condition analyzer 232 in cooperation with the reporting manager 236 to suggest possible different locations for one or more fans/airmovers and/or dehumidifiers.

The condition analyzer 232 may also be configured to determine a dehumidifier performance analysis in which temperature and/or humidity readings from one or more sensors 112 are converted into a humidity ratio (e.g., grains of water per pound of dry air (GPP)). The GPP value may be used to determine if the humidity ratio is remaining the same for the building 124 from one day to the next (providing an indication of unfavorable drying conditions), decreasing from one day to the next (providing an indication of favorable drying conditions), or increasing from one day to the next (providing an indication of unfavorable drying conditions). If unfavorable drying conditions are identified by the condition analyzer 232, then the reporting manager 236 may provide a user with a report indicating that operations of a dehumidifier should be checked and/or other sources of water should be checked within the building 124.

The condition analyzer 232 may also be configured to determine temperature changes and their impacts on drying conditions. For instance, the condition analyzer 232 may be configured to compare average temperature information from sensors 112 associated with a dehumidifier or fan (e.g., a trailing two hour average) with average temperature information from other sensors 112 associated with other restoration assets 116 (e.g., using a trailing two hour average). If the difference is more than a predetermined difference (e.g., 7 degrees Fahrenheit), then the drying conditions may be determined to be favorable.

As another example, the condition analyzer 232 may be configured to determine a vapor pressure differential and whether or not the vapor pressure differential corresponds to favorable or unfavorable drying conditions. A vapor pressure differential may be determined by using moisture content from sensor data as an indication of a degree of saturation and the temperature of the supplied air (e.g., air temperature read by another sensor 112) to calculate an assumed material vapor pressure. Then the condition analyzer 232 may subtract the calculated air vapor pressure (using temperature information and humidity information from sensor data) to determine a vapor pressure differential (e.g., a drying potential). The vapor pressure differential may then be evaluated (e.g., compared to a predetermined threshold value) to determine if drying conditions are favorable or unfavorable. It should also be appreciated that vapor pressure differential (or vapor pressure deficit (VPD)) may be calculated as the difference (deficit) between the amount of moisture in the air and how much moisture the air can hold when it is saturated at the same temperature as the evaporating material surface. As a non-limiting example, if the vapor pressure differential is greater than or equal to 1" hwg, then drying conditions may be determined as being favorable. If the vapor pressure differential is less than the predetermined threshold (e.g., 1" hwg), then drying conditions may be determined as being unfavorable. If vapor pressure differential indicates unfavorable drying conditions, then the condition analyzer 232 and reporting manager 236 may provide a report or indication to a user (via the communication device 120) suggesting remedial measures, to include that additional energy be applied to materials in the building 124 (e.g., increase fan speed, increase dehumidifier operational settings, etc.) to further decrease the humidity in the building 124.

The condition analyzer 232 may also be configured to determine an overall drying condition for the building 124, which includes a combined consideration of multiple independent drying condition determinations. For instance, the condition analyzer 232 may be configured to consider moisture content progress, an overall drying condition progress, an airmover installation test, and a dehumidification performance test to determine an overall drying condition for the building 124.

In operation, if the condition analyzer 232 fails to receive sensor data at expected times/intervals or receives sensor data indicating a restoration asset 116 has failed to continue working, then the condition analyzer 232 may notify the reporting manager 236, which generates a report or alert for the user. The report or alert generated by the reporting manager 236 may identify a location of the sensor 112 or associated asset 116 that has stopped reporting or that has been identified as stopping operation. This report or alert may allow the user to quickly identify non-operational assets 116 and physically inspect those assets 116, move those assets 116 according to the recommendations provided by the reporting manager 236, redirect the assets 116, increase power supplied to the assets 116, etc.

The processor 204 may correspond to one or many microprocessors that are contained within the housing of the controller 108 with the memory 208. In some embodiments, the processor 204 incorporates the functions of the user device's Central Processing Unit (CPU) on a single Integrated Circuit (IC) or a few IC chips. Alternatively or additionally, the processor 204 may include an Application Specific Integrated Circuit (ASIC), Field Programmable Gate Array (FPGA), or the like. The processor 204 may be a multipurpose, programmable device that accepts digital data as input, processes the digital data according to instructions stored in its internal memory, and provides results as output. The processor 204 may alternatively or additionally implement sequential digital logic as it has internal memory. As with most known microprocessors, the processor 204 may operate on numbers and symbols represented in the binary numeral system.

The one or more antennas 212 may be configured to enable wireless communications between the controller 108 and sensors 112, a communication device 120, a communication network 104, and/or some other device. As can be appreciated, the antenna(s) 212 may be arranged to operate using one or more wireless communication protocols and operating frequencies including, but not limited to, Bluetooth®, NFC, Zig-Bee, GSM, CDMA, WiFi, RF, and the like. By way of example, the antenna(s) 212 may be RF antenna(s), and as such, may transmit RF signals through free-space to be received by another device having an RF transceiver. One or more of the antennas 212 may be driven or operated by a dedicated antenna driver 216. Although depicted as separate components, one or more antennas 212 may operate as a sensor interface 220, meaning that sensor data may be received at an antenna 212 for processing by the processor 204.

In some embodiments, the controller 108 may include a power module. The power module may be configured to provide power to the parts of the controller 108 in order to operate. The power module may store power in a capacitor of the power module, may include one or more DC power sources (e.g., batteries), may include one or more AC power sources (e.g., a power transformer or converter that conditions power received from an external AC power source. As a non-limiting example, the power module may include a battery or other power source to supply power to parts of the controller 108. The power module may include a built-in power supply (e.g., battery) and/or a power converter that facilitates the conversion of externally-supplied AC power into DC power that is used to power the various components of the controller 108. In some embodiments, the power module may also include some implementation of surge protection circuitry to protect the components of the controller 108 from power surges.

The antenna(s) 212 and sensor interface(s) 220 may correspond to particular types of physical devices that enable the controller 108 to send and receive data communications. Such communications may include sensor data and other data structures and described herein. The controller 108 may alternatively or additionally include a network interface 224 that enables the controller 108 to communicate via the communication network 104. The network interface 224 may be implemented as an antenna 212 or may correspond to a physical port that enables wired communications between the controller 108 and the communication network 104. The network interface 224 may correspond to a physical device in the controller 108 that enables the controller 108 to communicate using the communication network 104 whereas the sensor interface(s) 220 may correspond to physical device(s) in the controller 108 that enable communications with sensors 112. As mentioned above, the sensor interface(s) 220 and/or network interface 224 may include a physical port (e.g., Ethernet port, serial communications port, parallel communications port, etc.), an antenna 212, or the like.

The controller 108 may include a communications module 228 that is configured to communicate with one or more different systems or devices either remotely or locally to the controller 108. Thus, the communications module 228 can be configured to format data packets for transmission by an antenna 212, sensor interface(s) 220, and/or network interface 224. The communications module 228 may be responsible for enabling the controller 108 to receive sensor data, extract sensor data from data packets received at an appropriate interface or antenna, receive reports or information for transmission to a communication device 120, format data packets to include the reports or information for transmission to a communication device 120, and generally enable the controller 108 to exchange communications with other devices in the system 100.

In some embodiments, components of the communications module 228 may include components that operate with the physical interface(s) of the controller 108 (e.g., antenna(s) 212, sensor interface(s) 220, network interface 224, etc.). In some embodiments, the communications module 228 and one or more physical interfaces may be provided in an Ethernet port, a WiFi card, a Network Interface Card (NIC), or the like.

Figure 3:
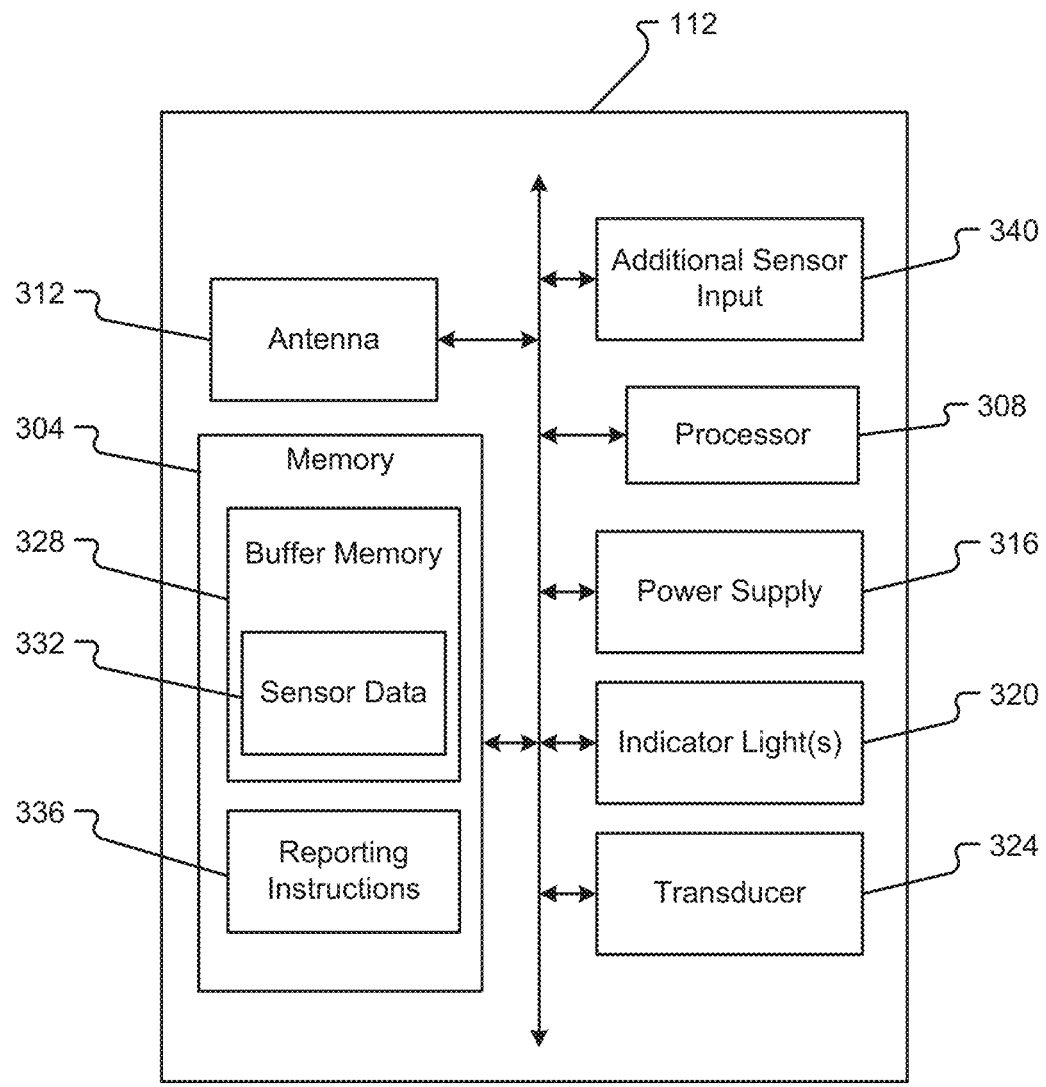
FIG. 3 illustrates a sensor according to at least one example embodiment.

With reference now to FIG. 3, additional details of a sensor 112 will be described in accordance with at least some embodiments of the present disclosure. As previously discussed, a sensor 112 may correspond to a traditional sensor device and/or a restoration sensor. A sensor 112 may be positioned within a building 124 by itself (e.g., without an association to any particular asset 116) or the sensor 112 may be associated with an asset 116 by being placed within a predetermined proximity of the asset 116, by being attached to the asset 116, or the like.

The illustrative sensor 112 is shown to include memory 304, a processor 308, an antenna 312, a power supply 316, one or more indicator lights 320, a transducer 324, and an additional sensor input 340.

The processor 308 may be similar or identical to processor 204. In some embodiments, the processor 308 may be configured to execute instructions stored in memory 304. The processor 308 may also be configured to operate other components of the sensor 112 based on a state of the sensor 112, based on environmental conditions, and the like.

The memory 304 may be similar or identical to memory 208 and may be configured to store instructions for execution by the processor 308. The sensor 112 may also be configured to store data (e.g., sensor data 332) until such time as the data can be communicated/transmitted to another system 100 node (e.g., another sensor 112 or the controller 108). The sensor data 332 may be stored in buffer memory 328 or any other type of memory device used for the short or long-term storage of data. Once sensor data 332 is transmitted by the sensor 112, the sensor data 332 may be deleted, erased, or overwritten with new sensor data 332.

The memory 304 may also be configured to store instructions 336 for execution by the processor 308. Illustrative instructions that may be stored in memory 304 include reporting instructions 336. The reporting instructions 336, when executed by the processor 308, may enable the sensor 112 to determine a frequency with which sensor data 332 is transmitted, increase a frequency with which sensor data 332 is transmitted, decrease a frequency with which sensor data 332 is transmitted, and so on. Specifically, the reporting instructions 336 may be configured to adjust a frequency with which sensor data 332 is reported based on whether or not the sensor 112 is currently receiving power from a power supply 316 and/or based on whether the sensor 112 is currently receiving power from a transducer 324. As an example, the reporting instructions 336 may increase the frequency with which sensor data 332 is communicated from memory 304 when power is being received from a renewable power source (e.g., the transducer 324) while the frequency with which sensor data 332 is communicated may be decreased if the power supply 316 (e.g., a battery or capacitor) is solely providing power to the sensor 112.

The sensor data 332 may be generated at the sensor 112 based on sensor readings obtained from the transducer 324 and/or based on information received form an additional sensor input 340. In some embodiments, the transducer 324 may be configured to generate sensor data 332 based on temperature, humidity, moisture, windspeed, airflow, or other conditions in proximity to the sensor 112. Other transducers may be external to the sensor 112 and may provide sensor data 332 to the sensor that describes information about other conditions not being reported by the transducer 324. As an example, the additional sensor input 340 may receive additional sensor data from an external sensor (other than sensor 112), and the external sensor may provide sensor data 332 describing an environmental condition (e.g., temperature, humidity, moisture, airflow, windspeed, etc.) that is in proximity to the sensor 112, but that is not being reported by the transducer 324. In some embodiments, the additional sensor input 340 may correspond to a data port, serial communication interface, parallel communication interface, data jack, or the like.

The indicator light(s) 320 may include a light emitting device, Light Emitting Diode (LED), lamp, or the like that are configured to activate/de-activate based on a current power status of the sensor 112. In some embodiments, an indicator light 320 may be activated when the transducer 324 is providing power to components of the sensor 112 and may be deactivated when the transducer 324 is not providing power to components of the sensor 112. Alternatively or additionally, the indicator light 320 may be activated when the power supply 316 is providing power to components of the sensor 112 and may be deactivated when the power supply 316 is not providing power to components of the sensor 112. The indicator light(s) 320 may provide a user to quickly discern whether the sensor 112 is operational based on power being supplied and based on the source of the power supply as the user walks by the sensor 112.

As mentioned above, sensors 112 may be configured to communicate wirelessly with other nodes in the system 100. A sensor 112 may be configured with an antenna 312 to facilitate such wireless communications. The antenna 312 may be configured to emit RF signals in free space for receipt by an antenna 212 of a nearby controller 108, for receipt by an antenna 312 of another sensor 112, for receipt of a wireless router or network access point, or the like.

Figure 4:
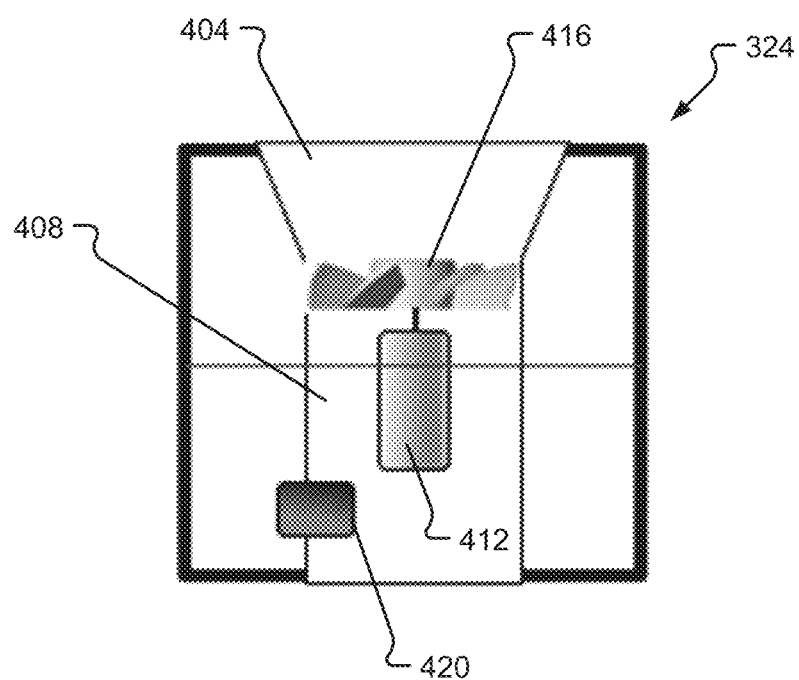
FIG. 4 illustrates a transducer for a sensor according to at least one example embodiment.

With reference now to FIG. 4, additional details of an illustrative transducer 324 will be described in accordance with at least some embodiments of the present disclosure. The transducer 324 illustrated in FIG. 4 may correspond to an aspirated psychrometer and is meant to be one, non-limiting, example of a transducer that may be included in a sensor 112, such as a restoration sensor. A restoration sensor 112 may correspond to any sensor 112 that is capable of being used in connection with a restoration or remediation process. The transducer 324 may be provided in a housing with other components of the sensor 112 or may be physically separated from the housing of the sensor 112. In a configuration where the transducer 324 is external to the sensor 112, then the transducer 324 may communicate with the sensor 112 via the additional sensor input 340.

The transducer 324 is shown to include a transducer body having an air intake 404 and an air flow channel 408. In some embodiments, moving air generated by a restoration asset 116 (e.g., a fan, airmover, dehumidifier, etc.) may be configured to flow through the flow channel 408. Airflow through the flow channel 408 may cause a turbine 416 to rotate. Rotational speed of the turbine 416 may cause a generator 412 to generate an electrical current, where an amount of electrical current generated in the generator 412 represents a speed of airflow through the flow channel 408. The electrical current generated in the generator 412 may be communicated to the sensor 112 as sensor data 332 representing air speed, wind speed, airflow information, etc. within a proximity of a restoration asset 116. In some embodiments, the electrical current used to represent the airflow through the flow channel 408 may also be used to provide power to components of the sensor 112. In some embodiments, when the turbine 416 is not rotating (e.g., because of a lack of sufficient airflow through the flow channel 408), then power may not be provided to components of the sensor 112 or power may need to be supplied by some other source (e.g., the power supply 316). Advantageously, the use of power from the transducer 324 may help to increase the overall life of the power supply 316, thereby minimizing the number of times the power supply 316 needs to be replaced if the power supply 316 is a battery or the like. In other embodiments, the power provided by the transducer 324 may supplement or fill in for situations where power is not available from the power supply 316 (e.g., during a power outage or when the power supply 316 becomes depleted). In the situation where the transducer 324 acts to supplement the power supply 316, the processor 308 may be configured to transmit all sensor data 332 and a low battery alert if the transducer 324 is detected as being the sole power supply to components of the sensor 112, because such a situation may indicate a power outage or failing battery condition.

Although not shown, the generator 412 may be electrically connected to the processor 308 or other components of the sensor 112 via electrical wires, a Printed Circuit Board (PCB), or the like. The transducer 324 may also include other sensing devices that measure environmental conditions other than airflow, wind speed, etc. For instance, the transducer 324 may include a temperature and/or humidity gauge 420. The temperature and/or humidity gauge 420 may be configured to measure temperature and/or humidity information from air flowing through the flow channel 408. This temperature and/or humidity information may be communicated as sensor data 332 and stored in memory 304. The times at which temperature and/or humidity information are obtained at the temperature and/or humidity gauge 420 may be correlated to airflow readings obtained at the turbine 416 and generator 412. Thus, an instance of sensor data 332 may include airflow information, temperature information, and/or humidity information for a particular point in time.

In some embodiments, sensor data 332 may be associated with a particular location in a building 124 and may describe an environmental condition in proximity to the position where the sensor 112 is positioned. In some embodiments, where the sensor 112 is associated with a restoration asset 116 having a known location, the position of the sensor 112 and sensor data 332 provided from the sensor 112 may be associated with the known location of the restoration asset 116.

Figure 5:
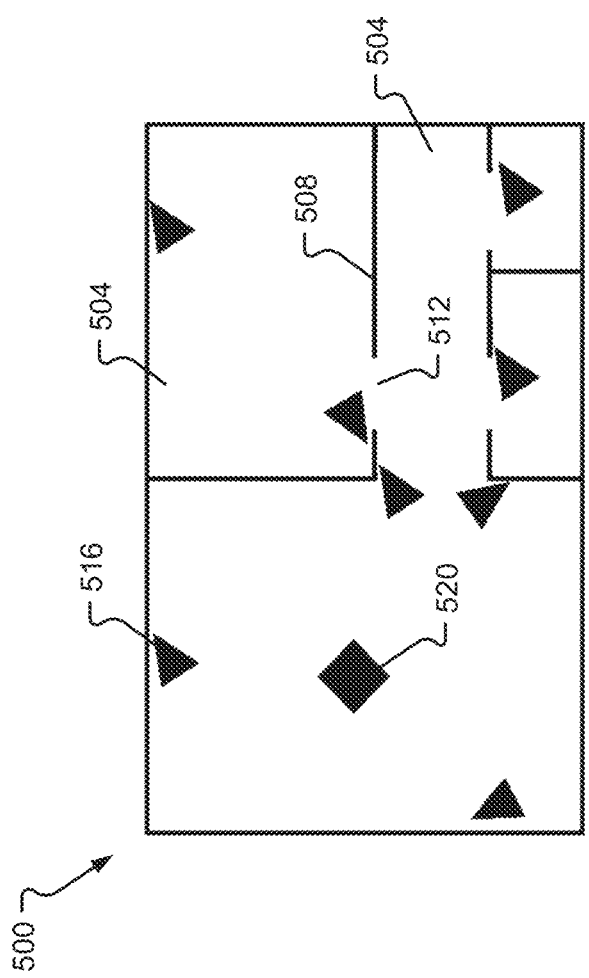
FIG. 5 illustrates a building layout with restoration assets distributed therein according to at least one example embodiment.

As shown in FIG. 5, a building layout 500 may include a number of rooms 504, dividers 508 between rooms 504, openings 512 between dividers 508, and a general position of these building 124 elements. The building layout 500 may also depict or graphically represent a position of restoration assets 116 therein. In some embodiments, the position of restoration assets 116 may also correlate to a position of sensors 112. In such a situation, sensor data 332 obtained from a particular sensor 112 having a particular location (e.g., known based on being associated with a restoration asset 116).

Restoration assets 116 may include fans/airmovers 516, dehumidifiers 520, heaters, and other equipment used in a restoration process. In some embodiments, each restoration asset 116 may have one or more sensors 112 associated therewith. In such an embodiment, the controller 108 may receive sensor data 332 from sensors associated with each of the restoration assets 116. The controller 108 may also be programmed with knowledge of the locations of the restoration assets 116 such that sensor data 332 received from a particular sensor 112 may be correlated to the known location of the restoration asset 116. Thus, the controller 108 may be configured to receive sensor data 332 from a plurality of sensors 112 distributed throughout the building 124 and may develop a map of drying conditions to overlay on the building layout 500. The map of drying conditions may indicate locations in the building layout 500 where drying conditions are favorable (e.g., with a predetermined color, shading, surface treatment, etc.) and locations in the building layout 500 where drying condition are unfavorable (e.g., with different colors, different shading, different surface treatments, etc.). The controller 108 may be configured to utilize the reporting manager 236 to output updated drying conditions relative to the building layout 500 such that a user of a communication device 120 can view the building layout 500 and positions of favorable and unfavorable drying conditions. The reporting manager 236 may also be configured to suggest different locations of restoration assets 116 to help improve the overall drying conditions for the building 124.

In some embodiments, the various restoration assets 116 or components attached thereto (e.g., a sensor 112) may include a machine-readable code. The machine-readable code may be provided in the form of a QR code, barcode, identification number, or the like. The machine-readable code may be scanned by an installer of restoration assets 116 as part of initially distributing the restoration assets 116 throughout a building. Locations of the restoration assets may be associated with identifiers of the assets (as read by the machine-readable code), thereby enabling restoration assets 116 to be found when searching at locations or vice versa.

Figure 6:
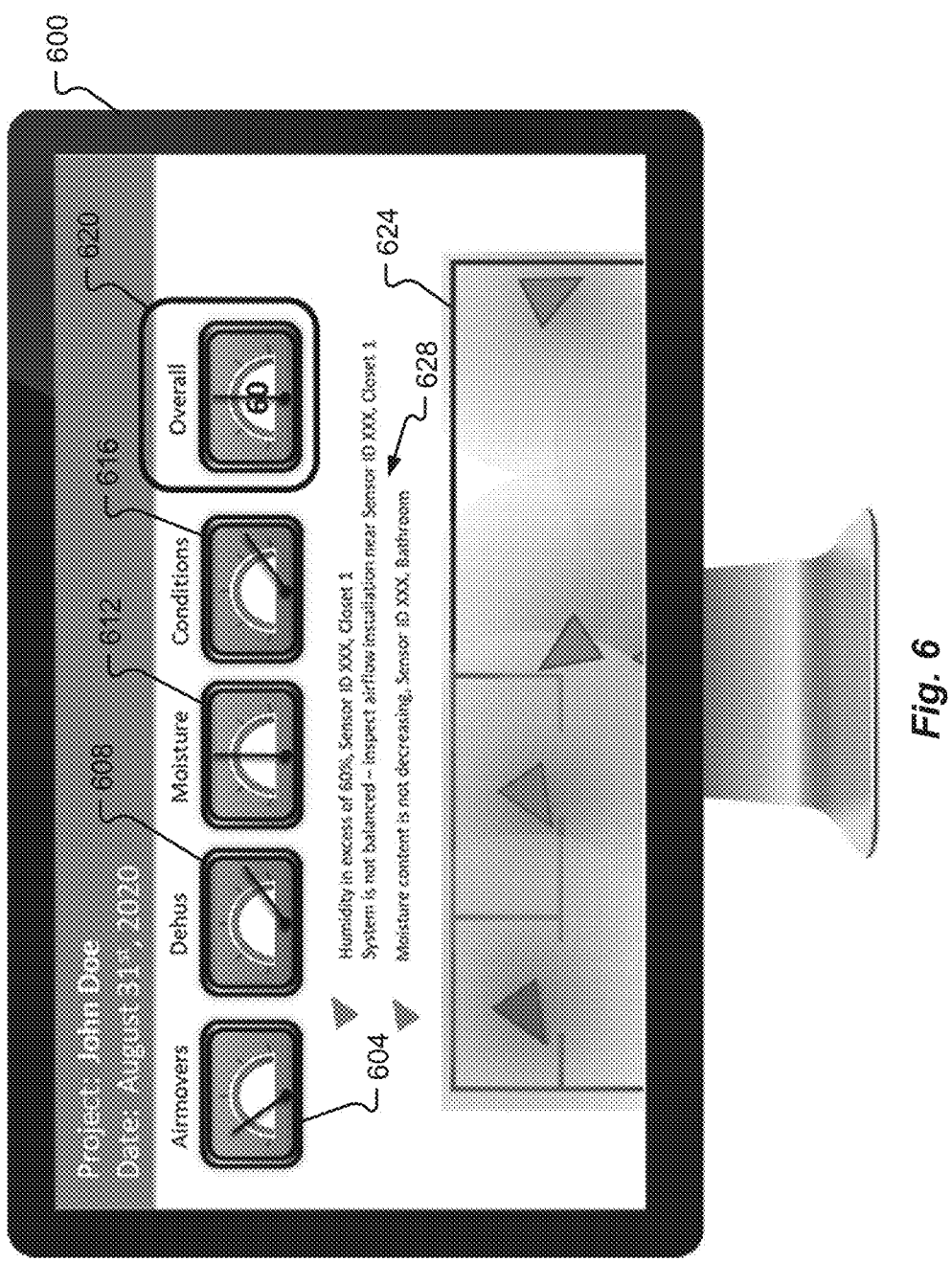
FIG. 6 illustrates a restoration report that includes a report of drying conditions for a building according to at least one example embodiment.

FIG. 6 illustrates a specific example of a report layout, which may include a number of drying condition information descriptions 604, 608, 612, 616, 620, a map 624 that includes the building layout 500 and a graphical representation of the drying conditions overlaid on the building layout 500, as well as a number of recommendations 628 for improving drying conditions. The report may be communicated by the controller 108 to a communication device 120 and rendered by a display 600 of the communication device 120.

It should be appreciated that the report can be formatted with any type of information known by or available to the controller 108. The types of drying condition information descriptions may include a fan/airmover condition 604, a dehumidifier condition 608, a moisture condition 612, general conditions 616, and overall drying conditions 620. The overall drying conditions 620 may correspond to a combined representation of two or more other conditions 604, 608, 612, 616. In some embodiments, the overall drying conditions 620 may correspond to a weighted representation and score of drying conditions that is calculated based on applying weighting factors to other conditions 604, 608, 612, 616.

The fan/airmover condition 604 may represent a status of fans/airmovers 516 and temperature/humidity information for the locations of the fans/airmovers 516. The fan/airmover condition 604 may alternatively or additionally indicate whether a particular fan/airmover 516 is operational (e.g., whether air movement is detected in proximity to the fan/airmover 516), whether drying conditions are favorable/unfavorable in proximity to the fan/airmover 516, and any other environmental condition related to a fan/airmover 516.

The dehumidifier condition 608 may represent a status of a dehumidifier 520 and temperature/humidity information for the locations of the dehumidifiers 520. The dehumidifier condition 608 may alternatively or additionally indicate whether a particular dehumidifier 520 is operational, whether drying conditions are favorable/unfavorable in proximity to the dehumidifier 520, and any other environmental condition related to a dehumidifier 520.

The moisture condition 612 may represent a moisture reading from a sensor 112, which may or may not be associated with a location of a restoration asset 116. The moisture condition 612 may include moisture readings from a moisture sensor, which may be part of sensor 112 or which may correspond to an external sensor that supplies moisture information to a sensor 112 via an additional sensor input 340.

The general conditions 616 may represent any type of moisture, drying, humidity, and/or temperature information. In some embodiments, the general conditions 616 may include a reporting of a vapor pressure differential for a particular location in the building 124 or for a combined reporting of vapor pressure differential (e.g., an average vapor pressure differential) based on readings from sensors 112 distributed throughout the building 124.

As noted above, the sensor information may be displayed graphically via the map 624, which can include location-specific drying condition information, status information for a particular restoration asset 112, or the like. In addition to the map 624, the recommendation information 628 may provide textual suggestions for improving drying conditions, graphical suggestions for improving drying conditions, or combinations thereof. In some embodiments, the recommendation information 628 may include suggestions to move particular restoration assets 116 to other locations in the building 124 to help improve drying conditions. The recommendation information 628 may also include a description of why drying conditions may not be favorable.

Figure 7:
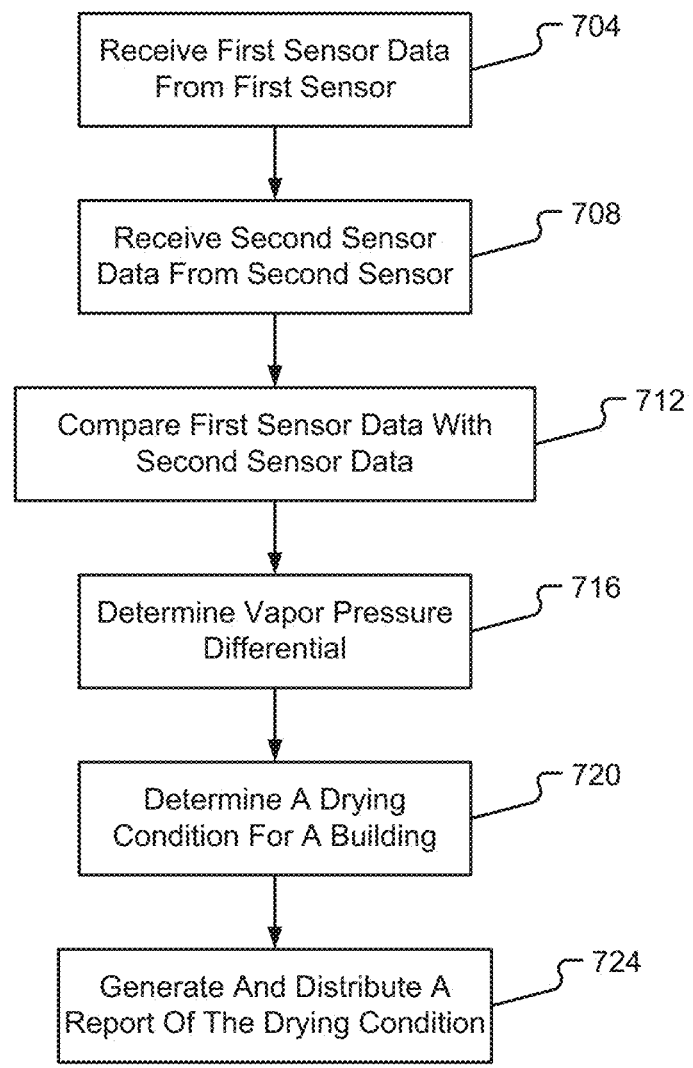
FIG. 7 is a flow diagram depicting a method for managing restoration assets according to at least one example embodiment.
Figure 8:
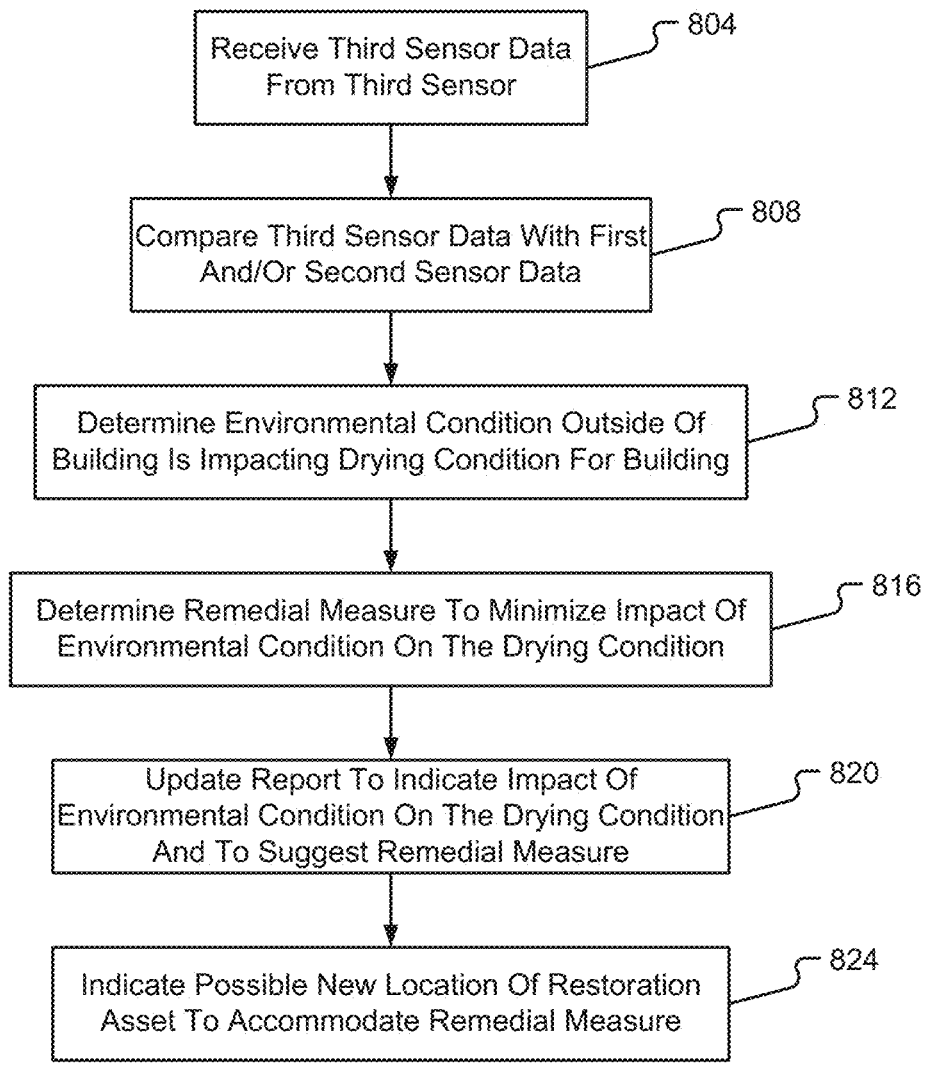
FIG. 8 is a flow diagram depicting another method for managing restoration assets according to at least one example embodiment.
Figure 9:
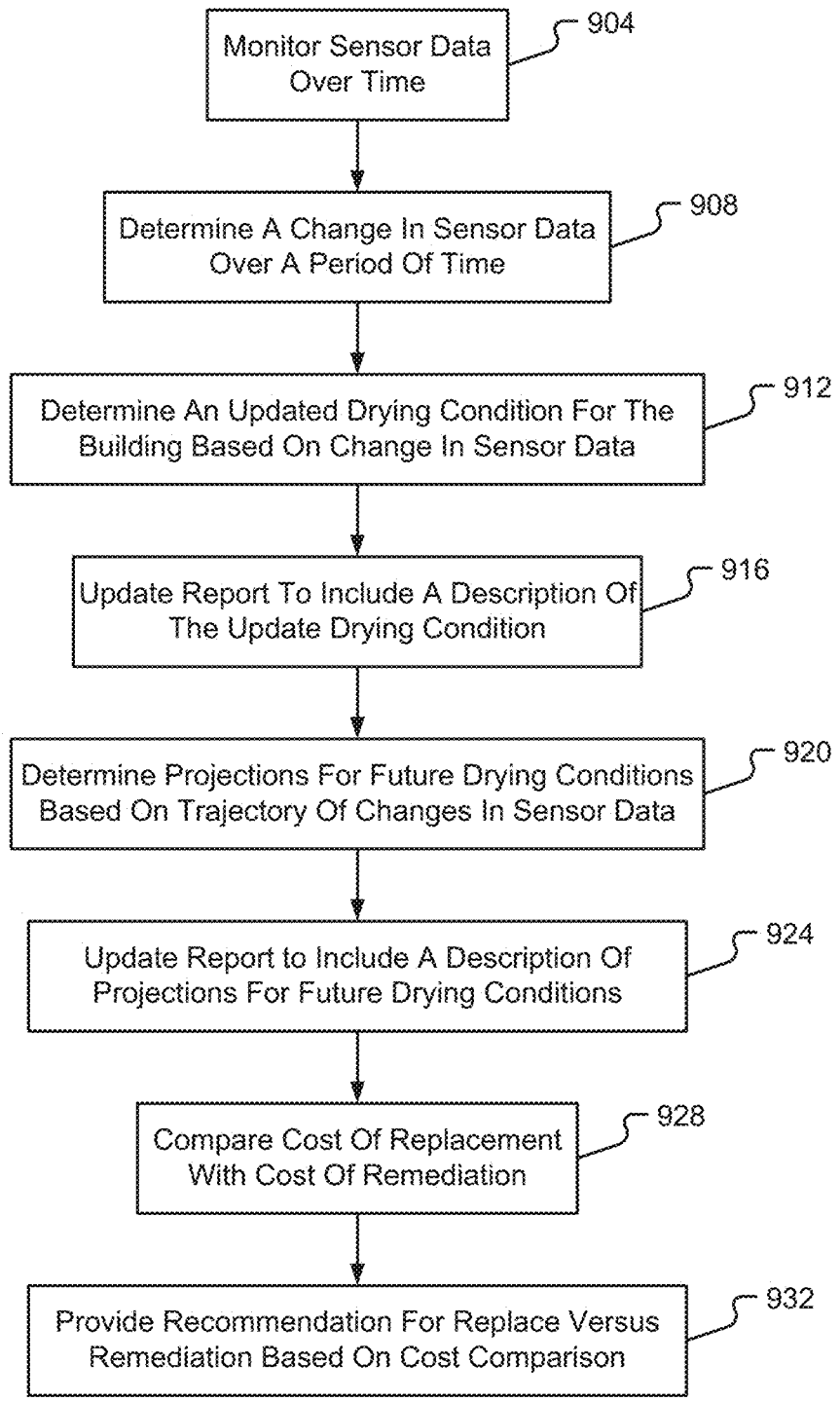
FIG. 9 is a flow diagram depicting a third method for managing restoration assets according to at least one example embodiment.

With reference to FIGS. 7-9, various methods of managing restoration assets 116 within a system 100 will be described in accordance with at least some embodiments of the present disclosure. The methods will be described with reference to particular components of a system 100, but it should be appreciated that any one or combination of components of the system 100 can be configured to executed the methods described herein. Moreover, it should be appreciated that the various methods may be performed in any order and steps from one method may be performed in another method without departing from the scope of the present disclosure.

Referring now to FIG. 7, a first method of managing restoration assets 116 will be described in accordance with at least some embodiments of the present disclosure. The method may begin when first sensor data 332 is received from a first sensor 112 (step 704). The first sensor data 332 may be received at a controller 108 (e.g., at an interface 212, 220, 224, at a processor 204, etc.) from a sensor 112 or within a sensor 112 from a transducer 324.

The method continues by receiving second senor data 332 from a second sensor 112 (step 708). The second sensor data 332 may be received at the controller 108 or within a sensor 112 from a transducer 324. The first sensor data 332 and second sensor data 332 may correspond to sensor data 332 received at the same time from different sensors 112 or may correspond to sensor data 332 received at different times from different sensors 112. The first sensor data 332 and second sensor data 332 may describe similar environmental conditions (e.g., temperature, pressure, humidity, airflow, wind speed, moisture readings, etc.) or may describe different environmental conditions.

The method may continue by comparing the first sensor data 332 and second sensor data 332 (step 712) and determining a vapor pressure differential based on the comparison thereof (step 716). The vapor pressure differential may be determined for a location associated with the first sensor 112 (and possibly a first asset 116 if the first sensor 112 is associated with a first asset 116), a location associated with the second sensor 112 (and possibly a second asset 116 if the second sensor 112 is associated with a second asset 116), a position between the first sensor 112 and second sensor 112, or any other position within the building 124.

Based on the determined vapor pressure differential, the method may continue by determining a drying condition or remedial action for the building 124 (step 720). The drying condition may be based entirely or partially on the determined vapor pressure differential. Moreover, a drying condition for the building 124 may be based on a number of different vapor pressure differentials determined for different locations in the building 124.

The controller 108 may then utilize the reporting manager 236 to generate and distribute a report of the determined drying condition(s) (step 724). The report may include a location of the determined drying condition(s) described in either text format or overlaid on a map 624 of the building layout 500.

With reference now to FIG. 8, a second method of managing restoration assets 116 will be described in accordance with at least some embodiments of the present disclosure. The method may be performed in combination with the method of FIG. 7. Steps of FIG. 8 may be performed before, after, or in parallel with steps of FIG. 7.

Initially, the method may include receiving third sensor data 332 from a third sensor 112 (step 804). The third sensor 112 may correspond to a sensor 112 that is positioned outside of the building 124 whereas other sensors 112 may be positioned within the building 124. The third sensor data 332 may include information describing an environmental condition outside the building 124.

The method may continue by comparing the third sensor data 332 with the first sensor data 332 and/or second sensor data 332 (step 808). Based on the comparison, the method may include determining whether an environmental condition outside of the building 124 is negatively or positively impacting drying of the building 124 (step 812). In some embodiments, the environmental condition outside of the building 124 may be determined to negatively impact the drying of the building 124 if the vapor pressure differential calculated based on the third sensor data 332 compared with the first or second sensor data 332 is higher than a vapor pressure differential calculated based on the first and second sensor data 332. In other words, if the third sensor data 332 increases the calculated vapor pressure differential for the system 100, then the environmental conditions may be determined to negatively impact the drying of the building. Such a determination may result in the controller 108 suggesting an additional action for the user to take to help improve drying conditions (e.g., move restoration assets 116, increase energy input to restoration assets 116, etc.) (step 816). As an example, if lower vapor pressure is measured using the third sensor data 332 (e.g., outdoor sensor(s)), then outdoor conditions may be determined to be having a positive impact on drying conditions inside a building. The sensor data 332 describing outdoor conditions may include other weather-related measures such as wind speed, total air flow volume around the building 124, etc.

In some embodiments, the determined remedial measure to minimize the impact of the environmental condition on the drying condition of the building 124 may include suggested new locations for restoration assets 116. The reporting manager 236 may be configured to update the report and graphically identify the negative impacts of the external environmental conditions on the drying conditions of the building 124 (step 820). Such indications may also include an update to recommendation information 628 that indicates possible new locations for the restoration assets 116 to accommodate the remedial measure (step 824). The recommendation may be provided textually and/or graphically by showing the current location of the restoration asset 116 and the suggested new location of the restoration asset 116 on the map 624.

Referring now to FIG. 9, another method of managing restoration assets 116 will be described in accordance with at least some embodiments of the present disclosure. The method begins by monitoring sensor data 332 over time (step 904). The sensor data 332 monitored in this step may correspond to individual sensor data 332 from a particular sensor 112 or the monitored sensor data 332 may correspond to sensor data 332 received from a plurality of different sensors 112 over time.

Based on monitoring the sensor data 332 over time, the condition analyzer 232 may determine a change in at least some sensor data 332 over a period of time (step 908). The period of time may correspond to a configurable time period (e.g., minutes, hours, day, week), a number of sensor data readings, or the like. The determined change in sensor data 332 over time may enable the condition analyzer 232 to update a drying condition for the building 124 (step 912). Specifically, based on a trajectory of the sensor data 332, changes in determined drying conditions, etc., the condition analyzer 232 may determine that the drying conditions for the building 124 are improving, failing to improve, getting worse, and so on.

The condition analyzer 232 may then communicate its determination of the updated drying conditions to the reporting manager 236, which updates a report to include a description of the updated drying condition (step 916). The report may indicate whether the drying conditions are improving or not and further identify the potential causes for the changes in drying conditions (or lack thereof). For instance, the report may identify which sensor 112 locations are contributing to the updated drying condition and whether remedial measures should be taken in those locations.

The condition analyzer 232 may also be configured to determine projections for future drying conditions based on the trajectory of changes in sensor data 332 (step 920). For example, the condition analyzer 232 may determine whether the trajectory of changes in sensor data 332 will result in a final, desired, drying condition for the building 124 (e.g., a determination that the building 124 is sufficiently dry as part of the restoration process) and when the building 124 will likely reach the final drying condition. The report generated by the reporting manager 236 may be updated to include a description of the projections for future drying conditions and the estimated time of the building reaching the final drying condition (step 924). Alternatively or additionally, future drying conditions can be forecast based on weather forecasts for the location in which the building is positioned. For example, if the building is located at a particular ZIP code, then a weather forecast for that ZIP code can be used to build or determine a projection for future drying conditions of the building 124. If the weather forecast calls for increased humidity, rain, snow, etc., then the future drying conditions of the building 124 may be determined to be unfavorable and additional restoration assets 116 may be required to assist future drying of the building 124 when the weather changes. On the other hand, if the weather forecast calls for decreased humidity, increased heat, etc., then the future drying conditions of the building 124 may be determined to be favorable and no additional restoration assets 116 may be required. In this sense, because weather forecasts may be considered an additional input to the system, the weather forecasts may be received from forecasting models and/or from weather forecasting websites that provide information on weather forecasts in a particular geographic location.

The condition analyzer 232 may further be configured to compare the costs of replacing various materials in the building 124 with costs of the continued restoration (step 928). Specifically, the costs of replacing a material may be compared with the costs of continuing to run the restoration assets 116. The reporting manager 236 may then update the report with a recommendation for replacing materials versus continuing the restoration process (step 932). The recommendation provided by the reporting manager 236 may depend upon the results of the comparison in step 928. For instance, if the costs of replacing the material (including labor and time) are less than the costs of continuing to run the restoration assets 116 (e.g., based on a cost of running the restoration assets 116 multiplied by the number of restoration assets 116 and the estimated amount of time until the building reaches the final drying condition), then the reporting manager 236 may recommend that materials be replaced instead of continuing the restoration process. Conversely, if the costs of replacing the material are more than the costs of continuing the run the restoration assets 116, then the reporting manager 236 may recommend continuing the restoration process.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

What is claimed is:

1. A method for managing restoration assets, the method comprising:
   receiving first sensor data from a first sensor, wherein the first sensor data provides information describing an environmental condition in proximity to a first restoration asset;
   receiving second sensor data from a second sensor, wherein the second sensor provides information describing an environmental condition in proximity to a second restoration asset;
   associating the first sensor with the first restoration asset;
   associating the second sensor with the second restoration asset;
   comparing the first sensor data with the second sensor data;
   determining, based on comparing the first sensor data with the second sensor data, a vapor pressure differential;
   based on the vapor pressure differential, determining a drying condition for a building in which the first restoration asset is provided; and
   providing a report of the drying condition, wherein the report comprises one or more of a proposed new location, a change in a quantity, and a change in type for at least one of the first restoration asset and the second restoration asset.

2. The method of claim 1, wherein the report includes one or more of a layout of the building, a depiction of the first restoration asset in the layout of the building, a depiction of the second restoration asset in the layout of the building, and a determination of whether the drying condition corresponds to a favorable drying condition or an unfavorable drying condition.

3. The method of claim 1, further comprising:
   receiving third sensor data from a third sensor, wherein the third sensor data provides information describing an environmental condition outside of the building;
   comparing the third sensor data with at least one of the first sensor data and the second sensor data; and
   providing a notification to a communication device that indicates the environmental condition outside of the building is impacting the drying condition for the building.

4. The method of claim 3, further comprising:
   providing, as part of the notification, a suggested remedial measure to minimize the impact of the environmental condition outside of the building on the drying condition for the building.

5. The method of claim 1, wherein one or more of the first sensor data and the second sensor data are received via a wireless signal.

6. The method of claim 1, wherein one or more of the first sensor data and the second sensor data comprises at least one of temperature data, humidity data, moisture data, vapor pressure data, and air flow data.

7. The method of claim 1, further comprising:
   determining a change in the first sensor data over a period of time;
   determining a change in the second sensor data over the period of time;
   based on the change in the first sensor data over the period of time and the change in the second sensor data over the period of time, determining an updated drying condition for the building; and
   providing a report of the updated drying condition to a communication device.

8. The method of claim 1, further comprising:
   providing a report of the drying condition to a communication device.

9. A restoration sensor, comprising:
   a transducer that generates first sensor data, wherein the first sensor data provides information describing an environmental condition in proximity to a first restoration asset;
   memory that stores the sensor data;
   a communication interface that receives second sensor data from a sensor, wherein the sensor provides information describing an environmental condition in proximity to a second restoration asset; and
   a processor that:
   associates the transducer with the first restoration asset;
   associates the sensor with the second restoration asset;
   compares the first sensor data with the second sensor data;
   determines, based on comparing the first sensor data with the second sensor data, a vapor pressure differential;
   based on the vapor pressure differential, determines a drying condition for a building in which the first restoration asset is provided; and
   provides a report of the drying condition, wherein the report comprises one or more of a proposed new location, a change in a quantity, and a change in type for at least one of the first restoration asset and the second restoration asset.

10. The restoration sensor of claim 9, wherein the communication interface comprises a wireless communication interface and wherein the second sensor data is communicated via a wireless communication protocol.

11. The restoration sensor of claim 9, wherein the report includes one or more of a layout of a building, a depiction of the first restoration asset in the layout of the building, a depiction of the second restoration asset in the layout of the building, and a determination of whether the drying condition corresponds to a favorable drying condition or an unfavorable drying condition.

12. The restoration sensor of claim 11, wherein the processor:
   receives third sensor data from a second sensor, wherein the third sensor data provides information describing an environmental condition outside of the building;
   compares the third sensor data with at least one of the first sensor data and the second sensor data; and provides a notification to a communication device that indicates the environmental condition outside of the building is impacting the drying condition for the building.

13. The restoration sensor of claim 12, wherein the processor:
provides, as part of the notification, a suggested remedial measure to minimize the impact of the environmental condition outside of the building on the drying condition for the building.

14. The restoration sensor of claim 9, wherein the second sensor data is received via a wireless signal.

15. A system, comprising:
a processor; and
memory storing instructions to cause the processor to:
receive first sensor data from a first sensor, wherein the first sensor data provides information describing an environmental condition in proximity to a first restoration asset;
receive second sensor data from a second sensor, wherein the second sensor provides information describing an environmental condition in proximity to a second restoration asset;
associate the first sensor with the first restoration asset;
associate the second sensor with the second restoration asset;
compare the first sensor data with the second sensor data;
determine, based on comparing the first sensor data with the second sensor data, a vapor pressure differential;
based on the vapor pressure differential, determine a drying condition for a building in which the first restoration asset is provided; and
provide a report of the drying condition, wherein the report comprises one or more of a proposed new location, a change in a quantity, and a change in type for at least one of the first restoration asset and the second restoration asset.

16. The system of claim 15, wherein the report includes one or more of a layout of the building, a depiction of the first restoration asset in the layout of the building, a depiction of the second restoration asset in the layout of the building, and a determination of whether the drying condition corresponds to a favorable drying condition or an unfavorable drying condition.

17. The system of claim 15, wherein the instructions further cause the processor to:
receive third sensor data from a third sensor, wherein the third sensor data provides information describing an environmental condition outside of the building;
compare the third sensor data with at least one of the first sensor data and the second sensor data; and
provide a notification to a communication device that indicates the environmental condition outside of the building is impacting the drying condition for the building.

18. The system of claim 17, wherein the instructions further cause the processor to provide, as part of the notification, a suggested remedial measure to minimize the impact of the environmental condition outside of the building on the drying condition for the building.

19. The system of claim 15, wherein one or more of the first sensor data and the second sensor data are received via a wireless signal.

20. The system of claim 15, wherein one or more of the first sensor data and the second sensor data comprises at least one of temperature data, humidity data, moisture data, vapor pressure data, and air flow data.

* * * * *